United States Patent [19]

Pierrat

[11] Patent Number: 5,065,265
[45] Date of Patent: Nov. 12, 1991

[54] AUTOMATIC DATA STORAGE CARTRIDGE LIBRARY WITH A STORAGE CARROUSEL HAVING ROTATABLE SUB-CARROUSELS

[76] Inventor: Michel A. Pierrat, 2355 24th St., Boulder, Colo. 80304

[21] Appl. No.: 495,761

[22] Filed: Mar. 19, 1990

[51] Int. Cl.⁵ .......................................... G11B 15/68
[52] U.S. Cl. ......................................... 360/92
[58] Field of Search ............................. 360/92

[56] References Cited

U.S. PATENT DOCUMENTS

| | | | |
|---|---|---|---|
| 3,603,597 | 9/1971 | Haake | 274/4 F |
| 3,658,193 | 4/1972 | Gross | 214/6 D |
| 3,797,923 | 3/1974 | Thevanaz | 352/123 |
| 3,848,264 | 11/1974 | Wilson | 360/92 |
| 3,883,895 | 5/1975 | Kawaharasaki | 360/92 |
| 4,275,425 | 6/1981 | Watanabe et al. | 360/92 |
| 4,614,474 | 9/1986 | Sudo | 414/281 |
| 4,860,133 | 8/1989 | Barinsky | 360/92 |
| 4,864,438 | 9/1989 | Munro | 360/92 |
| 4,907,889 | 3/1990 | Simone | 360/92 |
| 4,971,857 | 1/1978 | Whitney | 360/92 |

Primary Examiner—Robert S. Tupper
Attorney, Agent, or Firm—E. T. Barrett

[57] ABSTRACT

A storage library with a simplified operating mechanism for computer back-up data cartridges. The cartridge is placed in a tray in an opening in a sealed storage chamber and transported into and removed from a multi-tier storage carrousel by a robotic arm. When a tape is to be retrieved, the arm moves the stored cartridge either to a module or directly to the window tray. A simple transmission operating the carrousel permits any cartridge to be moved to the storage-retrieval station in no more than two revolutions of the multi-carrousel central drive shaft. The use of a carrousel reduces the distance the arm must travel and decreases the time for storage or retrieval of a cartridge. Only two of seven axes have incremental positioning controls: the vertical lift and the carrousel rotation. All other axes have fixed travel distances. A cartridge gripper is compliant, readily adaptable to different cartridge configurations, and materially reduces the need for precision positioning.

13 Claims, 9 Drawing Sheets

AUTOMATIC DATA STORAGE CARTRIDGE LIBRARY WITH A STORAGE CARROUSEL HAVING ROTATABLE SUB-CARROUSELS

BACKGROUND OF THE INVENTION

1. Field of the Invention

This invention relates to automatic libraries for the storing of information and more particularly to libraries for storing and retrieving back-up data for computer systems.

2. Description of Related Art

Data storage libraries have been in general use for a considerable time. Generally, these libraries suffer from one or more shortcomings, such as space requirements, storage capacity, retrieval times, and complex storage and retrieval mechanisms that are relatively expensive and subject to frequent service problems.

SUMMARY OF THE INVENTION

Computer installations store back-up data to reduce the amount of data that must be held in the computer memory and to preserve the data in the event of a computer mishap. The amount of data that must be stored, with the capability for retrieval when required is usually so great that manual storage and retrieval is not feasible.

The present invention provides a storage library with a simplified operating mechanism that offers increased reliability, the capacity to store a larger number of cartridges in a smaller space, modular construction that allows for the construction of different size libraries with the same basic components, and rapid storage and retrieval operations.

The cartridges are transported into and removed from a storage carrousel by a robotic arm. A cartridge is placed in the library by inserting it in a tray in an opening in a sealed storage chamber. The arm removes the cartridge from the tray and the window is automatically closed. The cartridge may then be directly placed in a carousel for storage.

Automatic libraries usually include a number of read-write devices that can record on or read from the cartridge tapes. These devices (referred to herein as "modules") may be used to record coding data on the tapes or to locate specific data. The robot arm is capable of moving a cartridge from the entrance window into a module and then into a coded storage location. When a tape is to be retrieved, the arm moves the stored cartridge either to a module or directly to the window tray. If the tape is placed in a module to locate specific data, the tape is subsequently removed from the module and placed in the window tray. Usually, each cartridge is coded, for example by a conventional bar code. When the cartridge is first placed in the storage library, the cartridge location is recorded with the cartridge code. When that cartridge is to be retrieved, the arm goes directly to the storage location. The software that controls these functions is conventional and its use is well know.

The unique design of the carrousel and the robotic arm permits an increase in storage capacity by as much as 30 or 40 percent without increasing the physical size of the library. A simple transmission operating the carrousel permits any cartridge to be moved to the storage-retrieval station in no more than two revolutions of the multi-carrousel central drive shaft. The use of a carrousel reduces the distance the arm must travel and decreases the time for storage or retrieval of a cartridge. The movement of the arm is limited to a swinging motion from a supporting and rotating column resulting in less weight carried by the arm. Because of the lower inertia, faster operation is feasible. Only two of seven axes have incremental positioning controls: the vertical lift and the carrousel rotation. All other axes have fixed travel distances. This arrangement simplifies the electronic controls and increases reliability. A unique cartridge gripper is compliant, readily adaptable to different cartridge configurations, and materially reduces the need for precision positioning.

DESCRIPTION OF THE PREFERRED EMBODIMENTS

As used herein, the term "module" refers to any device for writing and reading data to and from a recording medium or to a read-only device. The term "cartridge" means a data storage device for such information as computer data, music, etc. in either analog or digital format.

Figure 1:
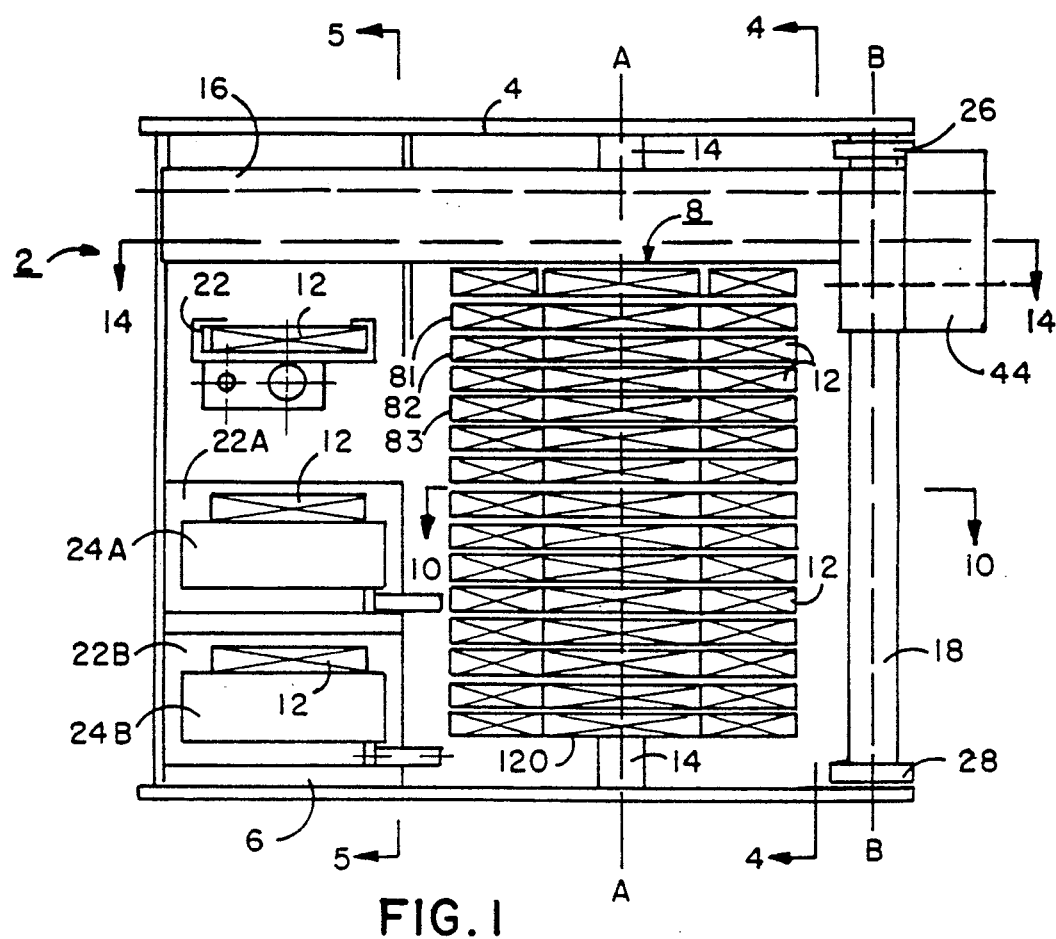
FIG. 1 is a front elevational view of the library with the protective housing removed.

The automatic library is mounted in a sealed housing that is not shown in these drawings but is of conventional construction. As shown in FIG. 1, the operating mechanisms of the library, generally indicated at 2, are structurally supported primarily by a top plate 4 and a bottom plate 6 that are suitably secured to and may form part of the library housing.

A carrousel, generally indicated at 8, provides a storage area for, in this example, as many as 60 individual cartridges 12. The carrousel 8 has 15 vertical tiers, indicated at 8-1, 8-2, 8-3 . . . , each providing storage space for 4 cartridges. The carrousel 8 is supported on a vertical shaft 14 that is rotatably supported by the top plate 4 and the bottom plate 6, permitting it to rotate about the axis A—A. As will be explained later, the carrousel may be stopped in any one of four primary positions and at each of these positions any one of four cartridges can be presented at a storage-retrieval station.

A horizontally extending arm, generally indicated at 16, is slidably mounted on a vertical column 18 rotatably supported by the top and bottom plates 4 and 6 for rotation about an axis B—B. The shaft 14 and column 18 are driven by separate servomotors (not shown) in such manner as to provide the motions to be described later. The arm 16, in conjunction with the rotation of the carrousel 8, moves the cartridges 12 among three positions: a tray 22, one of two modules 24a and 24b and a storage area on the carrousel 8.

Figure 2:
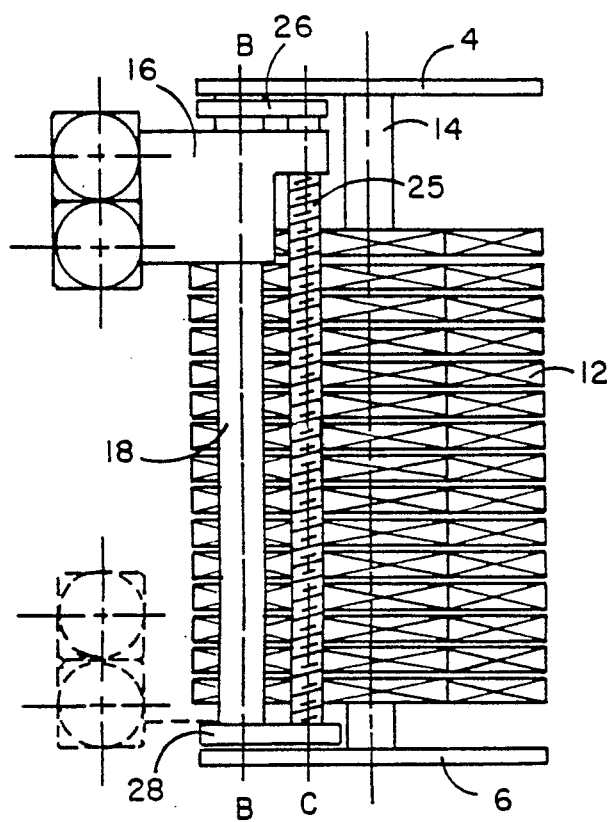
FIG. 2 is a similar view from the right side of the library.

As shown in FIG. 2, a lead screw 25, rotatably supported in an upper end plate 26 and a lower end plate 28, is spaced from and parallel with the column 18. These end plates are secured to and rotate with the column 18 while the lead screw 25 rotates about its own axis C—C. The lead screw 25 is driven in conventional manner by a servomotor (not shown) that is mounted on either plate 26 or 28. The lead screw 25 is in threaded engagement with the arm 16 so that rotation of the column 18 about the axis B—B causes the lead screw 25 and the arm 16 to swing in a plane parallel with the support plates 4 and 6. Rotation of the lead screw 25 moves the arm 16 in a vertical direction perpendicular to the planes of the plates 4 and 6.

Figure 3:
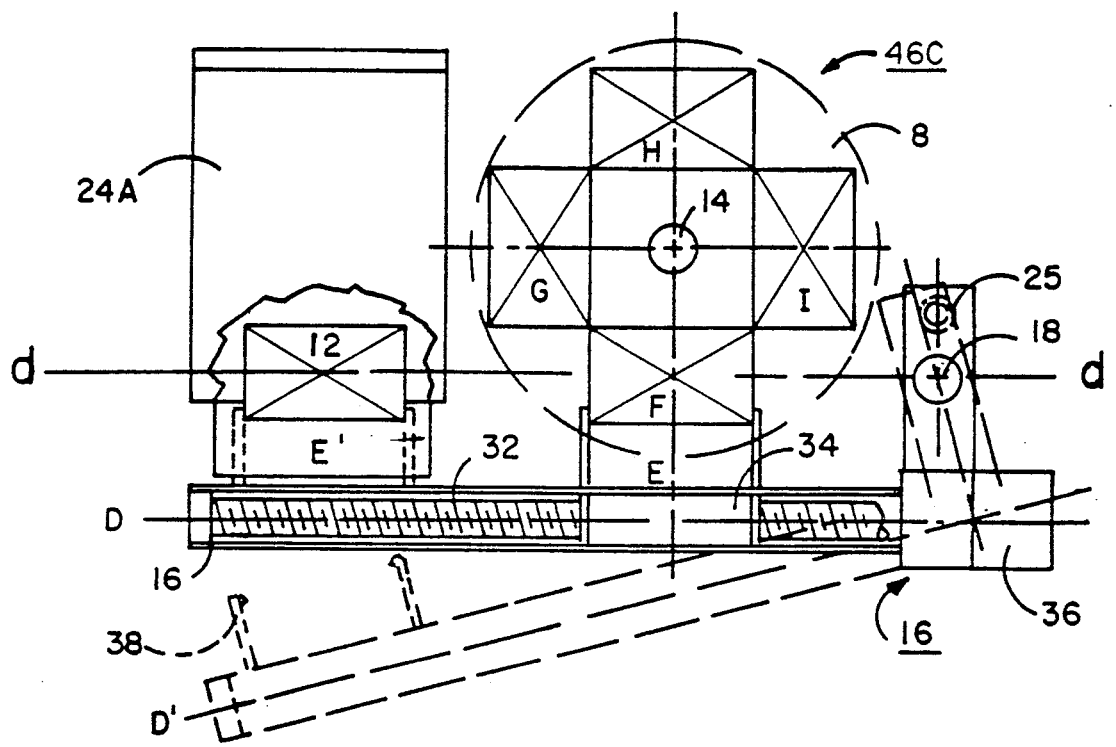
FIG. 3 is a top view of FIG. 1.

The arm 16 includes a hollow section within which a lead screw 32 is rotatably mounted (FIG. 3). The lead screw is in threaded engagement with a carriage 34 that slides horizontally along a slot (not shown) in the wall of the arm 16. The lead screw 32 is driven by a conventional servomotor 36 that is mounted on the arm 16. The center of rotation of the column 18 (axis B—B) is approximately on a line d—d passing through the center of a cartridge 12 positioned at the storage-retrieval station E of the carrousel 8 and a second cartridge 12 in the module 24a.

Figure 4:
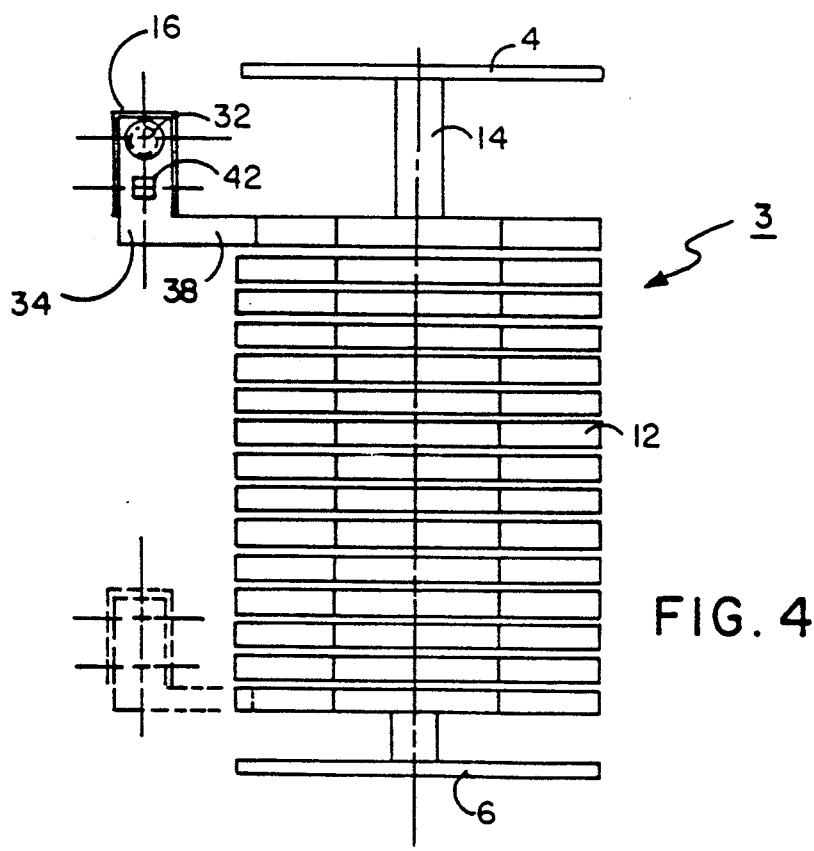
FIG. 4 is a cross section of FIG. 1 taken along line 4—4.
Figure 6:
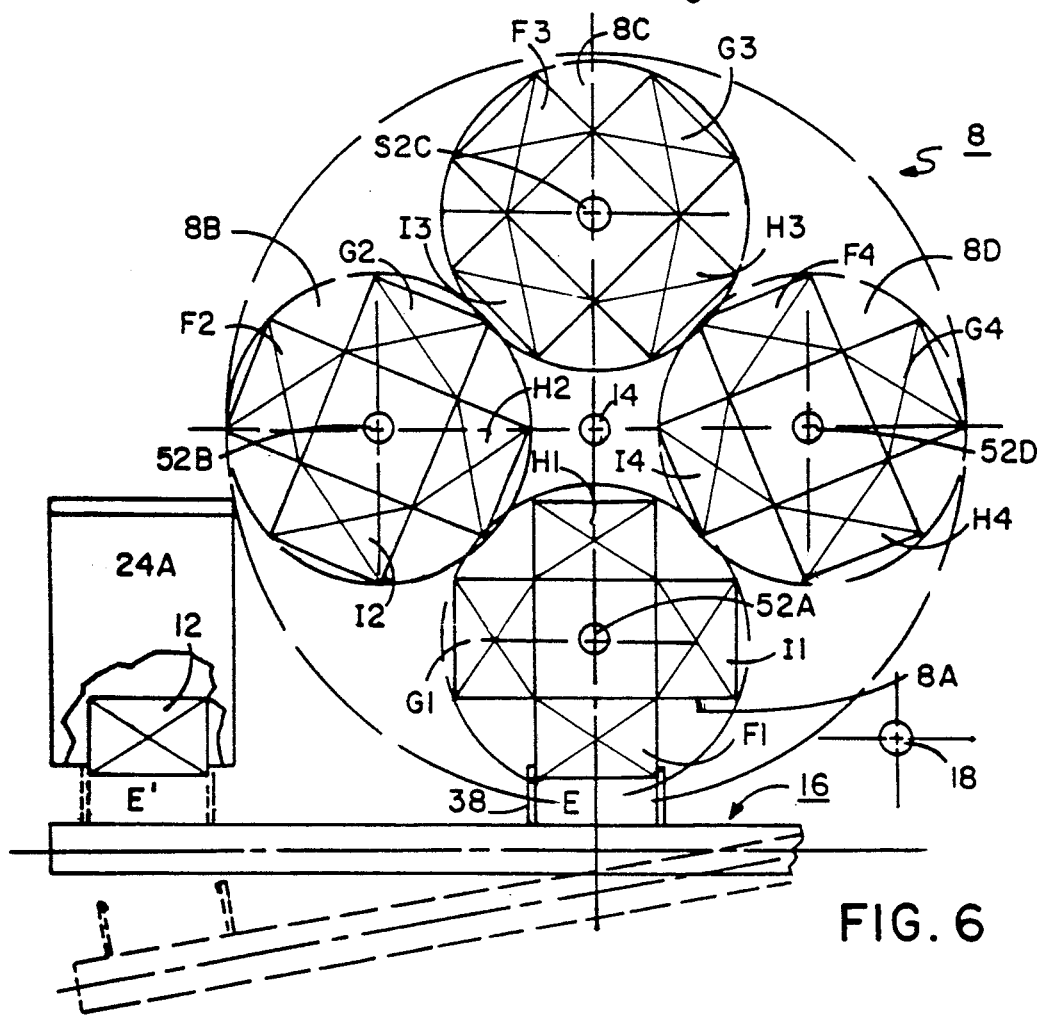
FIG. 6 is a top view of a similar library using four sub-carrousels and a single robotic arm.

The carriage 34 is provided with a gripper 38 designed to fit and hold one of the cartridges 12. Operation of the gripper 38 is controlled by a drive shaft 42 (FIG. 4). Rotation of the column 18 swings the arm 16 between the positions D and D' (FIG. 3). Rotation of the lead screw 32 causes the carriage 34 to move horizontally from the carrousel storage-retrieval station E to position E'. At station E the carriage 34 is aligned with a cartridge 12 in the carrousel 8, and at position E' is aligned with a cartridge 12 in the module 24a and the tray 22. As shown in FIG. 6, a sub-carrousel 8a has spaces, F, G, H and I, for four cartridges any one of which may be presented at the storage-retrieval station E as will be described presently.

Figure 5:
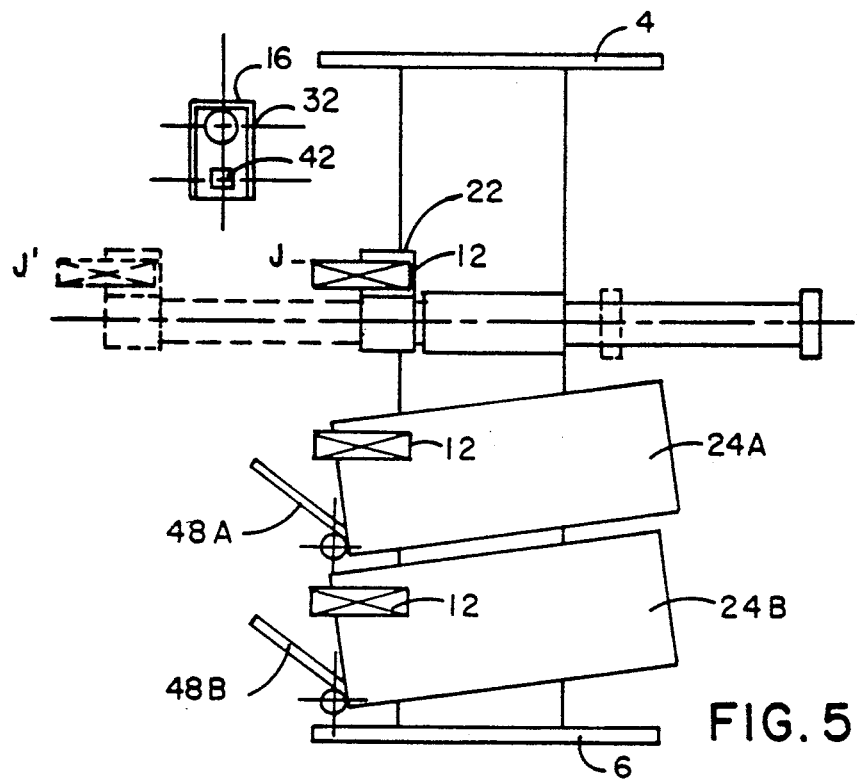
FIG. 5 is a cross section of FIG. 1 along line 5—5.

FIG. 5 shows the tray 22 in position J containing a cartridge 12. In this position, this cartridge is aligned vertically with the cartridges 12 shown in the modules 24a and 24b. The modules 24a and 24b are shown with their loading doors 48a and 48b in the open position. In position J', the cartridge 12 has been carried by the tray 22 from position J to a position such that the cartridge 12 will pass through the entrance door (not shown) of the library housing where it can be manually removed from the tray.

As shown in FIG. 6, the carrousel 8 comprises four sub-carrousels, generally indicated at 8a, 8b, 8c, and 8d, respectively supported for rotation about its own axis by shafts 52a, 52b, 52c and 52d. The rotation of the central shaft 14 produces a synchronized rotation of the four sub-carrousel shafts 52. The synchronization is such that when the shaft 14 rotates $\frac{1}{4}$ of a revolution in a counterclockwise direction, each sub-carrousel moves in the same direction by 1/16 of a revolution relative to the carrousel 8. For example, a cartridge slot $F_1$ is shown positioned at the storage-retrieval station E in FIG. 6. If the carrousel 8 is now moved one quarter of a revolution in a counterclockwise (CCW) direction to bring the sub-carrousel 8b to the storage-retrieval station without rotation of the sub-carrousel 8b, the storage slot $F_2$ will be positioned so that a CCW rotation of the sub-carrousel 8b equal to 1/16 of one revolution will be required to bring the storage slot $F_2$ to the storage-retrieval station E. From the position shown in FIG. 6, if the carrousel 8 is rotated CCW one-half of a revolution, the storage slot $F_3$ of the sub-carrousel 8c will be positioned at the storage-retrieval position E because it will have rotated $\frac{1}{8}$ of a revolution in the same direction relative to the carrousel 8. If the carrousel 12 is rotated $\frac{1}{4}$ of a revolution in a CCW direction, the storage slot $F_4$ will be positioned at the storage-retrieval station E because it will have rotated 3/16 of a revolution relative to the carrousel 8. When the carrousel 8 is rotated one full turn CCW, the storage slot $G_1$ of the sub-carrousel 8a will be positioned at the storage-retrieval station. To align the storage slot $H_1$ on the sub-carrousel 8a with the storage-retrieval station E, two clockwise (CW) or two CCW revolutions of the carrousel 8 are required To bring the storage slot $G_2$ of the sub-carrousel 8b into alignment with the storage-retrieval station E, $1\frac{1}{4}$ CCW revolutions of the carrousel 8 is required. To bring any storage slot on the carrousel 12 into alignment with the storage-retrieval station E, no more than two revolutions, CW or CCW, of the shaft 14 is required. The following is a tabulation of the number of revolutions and the direction of the shaft 14 required to bring any storage slot to the storage-retrieval station E, (from the position shown in FIG. 6).

Figure 7:
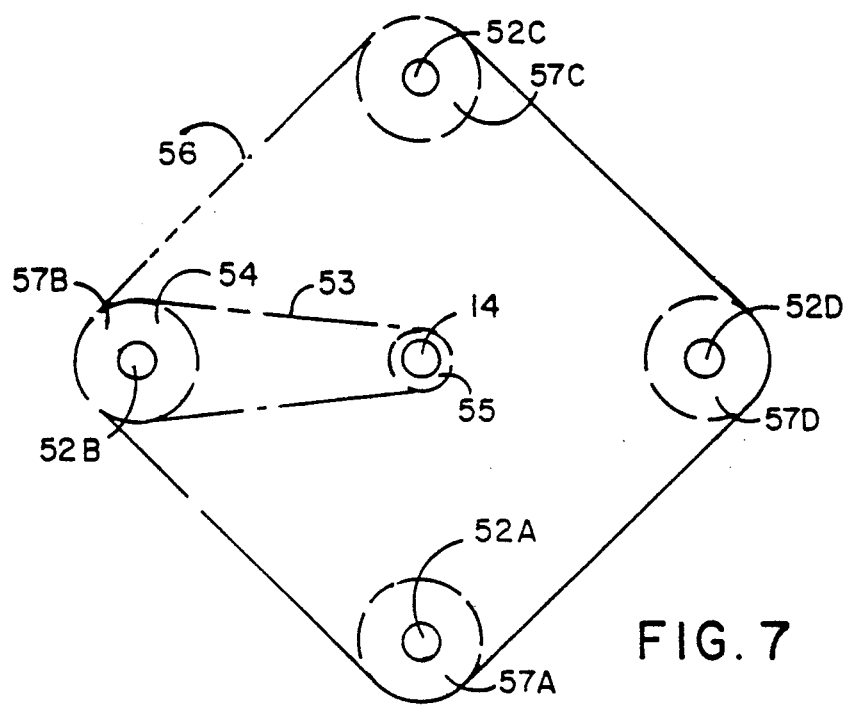
FIG. 7 is a diagrammatic view of a synchronizing drive system for the sub-carrousels of FIG. 6.

$F_1$: 0
$F_2$ $\frac{1}{4}$ CCW
$F_3$ $\frac{1}{2}$ CCW
$F_4$ $\frac{3}{4}$ CCW
$G_1$ 1 CCW
$G_2$ $1\frac{1}{4}$ CCW
$G_3$ $1\frac{1}{2}$ CCW
$G_4$ $1\frac{3}{4}$ CCW
$H_1$ 2 CCW or CW
$H_2$ $1\frac{3}{4}$ CW
$H_3$ $1\frac{1}{2}$ CW
$H_4$ $1\frac{1}{4}$ CW
$I_1$ 1 CW
$I_2$ $\frac{3}{4}$ CW
$I_3$ $\frac{1}{2}$ CW
$I_4$ $\frac{1}{4}$ CW The shaft 14 and the sub-carrousel drive shafts 52 may rotate in the same direction or in opposite directions depending upon the design of the synchronizing system. A suitable drive system for the sub-carrousels is shown in FIG. 7. A non-slip, positive transmission 53 such as a chain or timing belt with the proper ratio provides rotation of a shaft 52b as follows: A sprocket 54 is secured to shaft 52b. (The term "sprocket" as used here and in the claims means a sprocket, pulley, or functionally equivalent device.) Another sprocket 55 is secured to the top of bottom plate 4 or top plate 6, concentric with the center of shaft 14, but not secured to the shaft 14. Another chain or timing sprocket 56 connects all of the four shafts 52a, 52b, 52c and 52d by sprockets 57 so they all rotate at the same speed. Upon rotation of the shaft 14, the centers of all of the shafts 52 will move in an arc and, during this motion, the shafts 52 will also rotate, in the same direction, around their own respective centers. The amount of rotation will be proportional to the ratio between sprockets 54 and 55. In the case of FIG. 6, the ratio between sprockets 54 and 55 is 2:1.

In another embodiment, a multi-stage carrousel, generally indicated at 82 (FIG. 8), has four primary arms 84a, 84b, 84c, and 84d that are secured to and rotate with the shaft 93. Each of these arms rotatably supports a satellite carrousel, generally indicated at 86a, 86b, 86c, and 86d. The satellite carrousel 86a is rotatably mounted on a shaft 92a and has four arms each rotatably supporting a sub-carrousel indicated at 94a, 94a', 94a" and 94a''', each with four storage slots. Similar sets of sub-carrousels are rotatably mounted on shafts 92b, 92c, and 92d. By this means, each tier of the carrousel 82 has 64 storage slots, so that a carrousel with fifteen tiers has storage space for 960 cartridges.

Each multi-carrousel 82 is rotatably mounted, by means of the central shaft 93 on top and bottom members (not shown). A relatively simple synchronizing transmission (not shown) between shaft 93 and the four satellite shafts 92a, 92b, 92c and 92d, rotates each satellite shaft one-quarter of a revolution for each revolution of the central shaft 93. All shafts are rotated in the same direction. A maximum of eight revolutions of the central shaft 93, CW or CCW, will bring any one of the cartridge storage slots to the storage-retrieval station E. This simple synchronization system (similar to that of FIG. 7) is both economical and reliable. A more complicated drive system will reduce the maximum required rotation of the shaft 93, CW or CCW, to 2½ turns, but requires the use of additional servomotors and a clutching arrangement. For most applications, the decrease in storage and retrieval time does not justify the added complexity.

Figure 8:
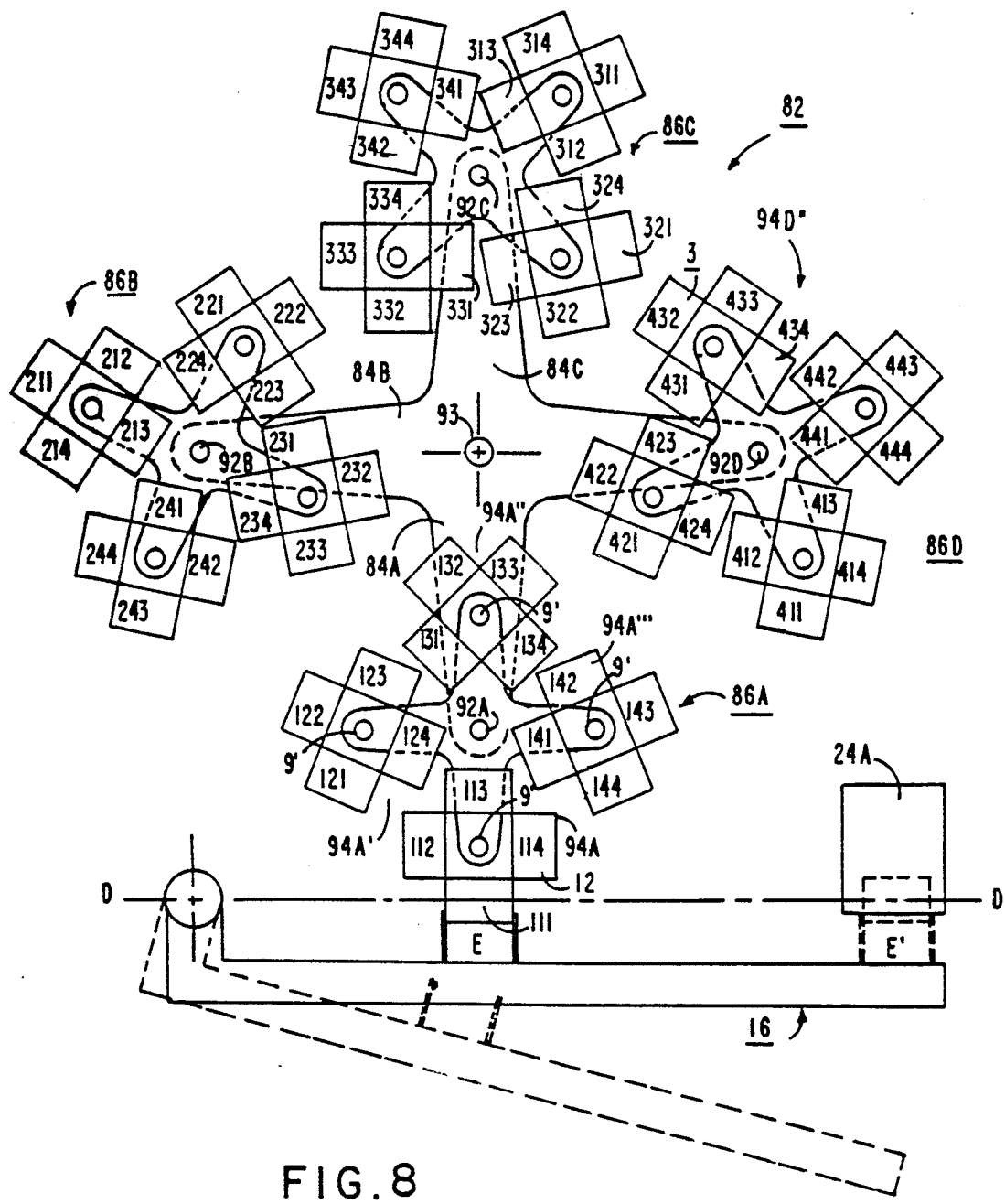
FIG. 8 is a top view of another similar library with sixteen satellite carousels and a single swing arm.

For purposes of explanation, the storage slots have been position-coded in FIG. 8 with three digits as follows: the first digit indicates the primary satellite 86 and varies from 1 to 4; the second digit indicates the position of the sub-carrousel 94 inside the satellite carrousel 86; and the last digit indicates the position of the storage slot in the sub-carrousel. All numbering starts at 6 o'clock, the position of the storage-retrieval station E, and the direction of movement is in a clockwise direction. For example, the first cartridge storage slot at the storage-retrieval station E is numbered "111". A number "432" indicates a cartridge storage slot located in the fourth satellite carrousel 86d, in the third sub-carrousel 94d" and in position 2 inside this carrousel. The following is a tabulation of all of the rotating motions, of the shaft 93, with direction of rotation, required to bring each of the storage slots to the storage-retrieval station E.

| | |
|---|---|
| 111: 0 | 121: 1 CCW |
| 131: 2 CCW | 141: 3 CCW |
| 112: 4 CCW | 122: 5 CCW |
| 132: 6 CCW | 142: 7 CCW |
| 113: 8 CW/CCW | 123: 7 CW |
| 133: 6 CW | 143: 5 CW |
| 114: 4 CW | 124: 3 CW |
| 134: 2 CW | 144: 1 CW |
| 211: ¼ CW | 221: 1¼ CCW |
| 231: 2¼ CCW | 241: 3¼ CCW |
| 212: 4¼ CCW | 222: 5¼ CCW |
| 232: 6¼ CCW | 242: 7¼ CCW |
| 213: 7¾ CW | 223: 6¾ CW |

-continued

| | |
|---|---|
| 233: 5¾ CW | 243: 4¾ CW |
| 214: 3¾ CW | 224: 2¾ CCW |
| 234: 1¾ CCW | 244: ¾ CW |
| 311: ½ CCW | 321: 1½ CCW |
| 331: 2½ CCW | 341: 3½ CCW |
| 312: 4/12 CCW | 322: 5½ CCW |
| 332: 6½ CCW | 342: 7½ CCW |
| 313: 7½ CW | 323 6½ CW |
| 333: 5½ CW | 343 4½ CW |
| 314 3½ CW | 324 2½ CW |
| 334: 1½ CW | 344: ½ CW |
| 411: ¾ CCW | 421: 1¾ CCW |
| 431: 2¾ CCW | 441: 3¾ CCW |
| 412: 4¾ CCW | 422: 5¾ CCW |
| 432: 6¾ CCW | 442: 7¾ CCW |
| 413: 7¼ CW | 423: 6¼ CW |
| 433: 5¼ CW | 443: 4¼ CW |
| 414: 3¼ CW | 424: 2¼ CW |
| 434: 1¼ CW | 444: ¼ CW |

Figure 9:
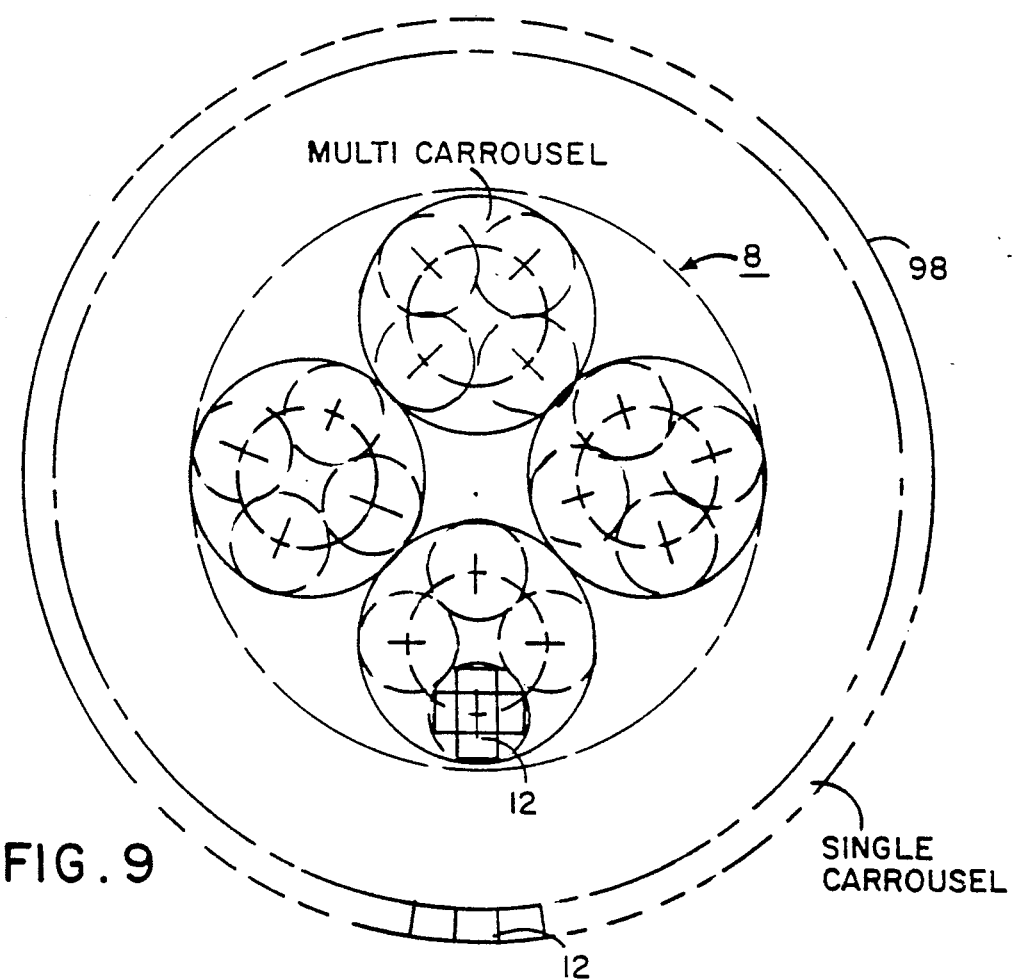
FIG. 9 illustrates the space saving made possible by the use of a multi-carrousel design.

FIG. 9 illustrates the large difference in storage capacity between a conventional carrousel and the multi-carrousel described here. The central part of the drawing represents the carrousel 8 as shown in FIG. 6 which has 64 storage slots on each tier. The outer circles, in broken lines, show a conventional carrousel 98 and the relative dimensions that would be required to provide the same amount of storage. The conventional carrousel requires 2.5 times the surface area required by the multi-carrousel 8. Moreover, the multi-carrousel 8 is made of modular components small enough in size to be made to precise dimensions and transported in one piece. Because of this precision, cartridges are easier to retrieve and do not require a "smart" robot to compensate for large variations in the location of the stored cartridges. Cartridges can readily be positioned within one millimeter. Conventional systems have required as much as 6 to 12 millimeter tolerance acceptance.

Figure 10:
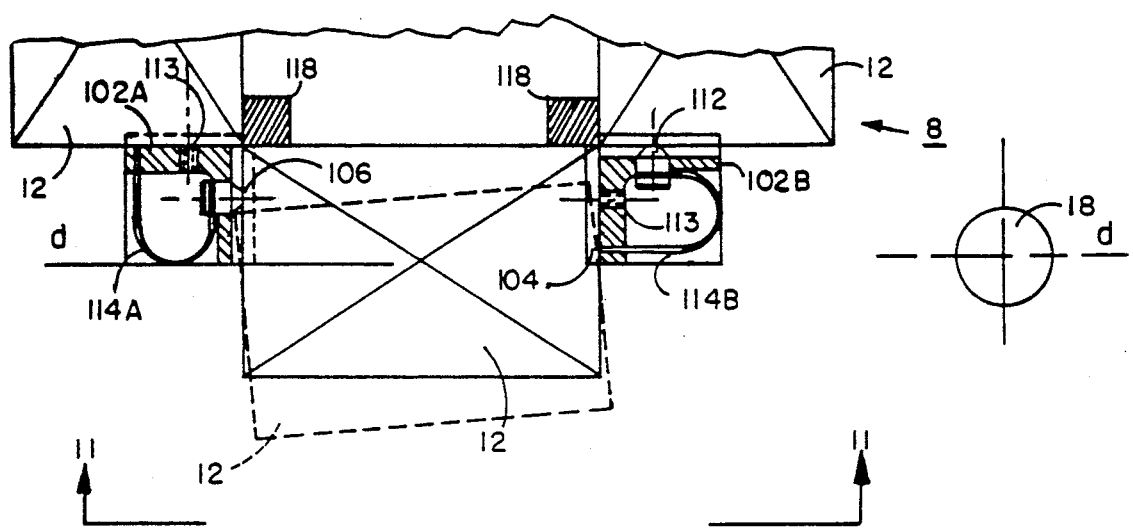
FIG. 10 is an enlarged partial section along line 10—10 of FIG. 1.
Figure 11:
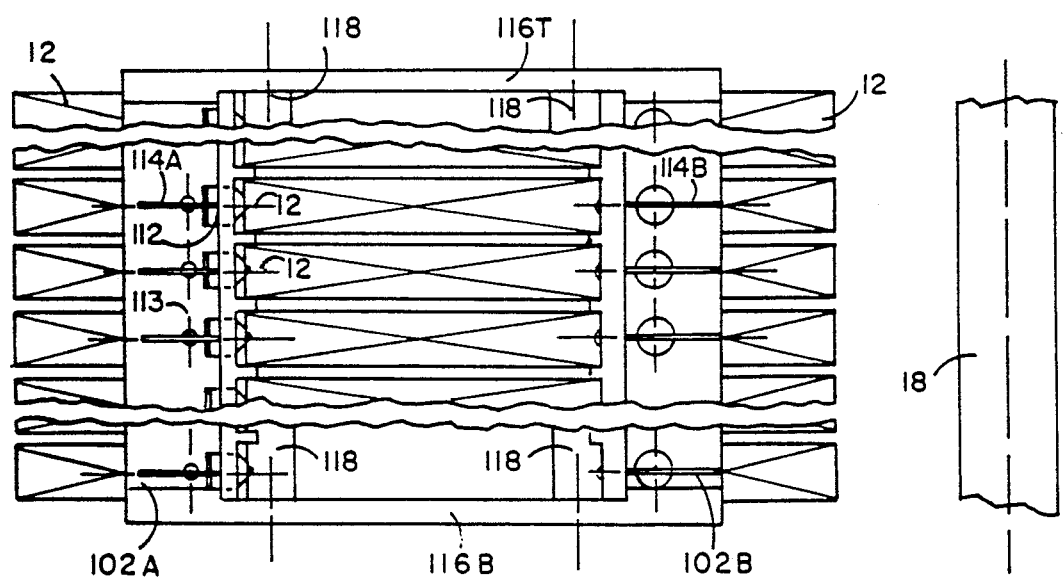
FIG. 11 is a partial view along line 11—11 of FIG. 10.

Referring to FIGS. 10 and 11, the cartridges 12 are held in place in the carrousel 8 by two vertical members 102a and 102b. There are four such members for each sub-carrousel, each provided with storage areas between opposing slots 104 and 106 which are slightly wider vertically than the thickness of the cartridge 12. The slot 106 is deeper than the opposing slot 104 to allow clearance, as at 108, (FIG. 10) for the swing of the cartridge 12 during insertion and removal. To make certain the cartridge is always positioned in the same location, a spring-biased button 112 (FIG. 10) pushes the cartridge toward the slot 104 against a pin or screw 113 which fits into a recess of the cartridge 12. A spring member 114a allows motion of the button 112 along an axis perpendicular to the arcuate direction of travel of the cartridge 12 during insertion and removal. There are as many storage areas, formed by the slots 104 and 106 in the members 102, as there are vertical tiers of storage space. (See also FIG. 11.) The distance between the tiers of cartridge slots is held to the minimum compatible with suitable mechanical strength. The four members 102 are clamped between a top plate 116t and a bottom plate 116b by four tie rods 118 that also act as horizontal stops for the cartridges to limit the depth of insertion. This arrangement considerably simplifies the construction of the carrousel and allows greater flexibility in the number of vertical storage tiers to be provided. The members 102 and the tie rods 118 can be cut to length in one tier increments. As noted above, it is important that the center line of the rotating column 18 be on an axis that is parallel with the face of the carrousel and centered with the center of the cartridge 12 when it is in its stored position, as represented by the line d—d in FIG. 3.

Figure 12:
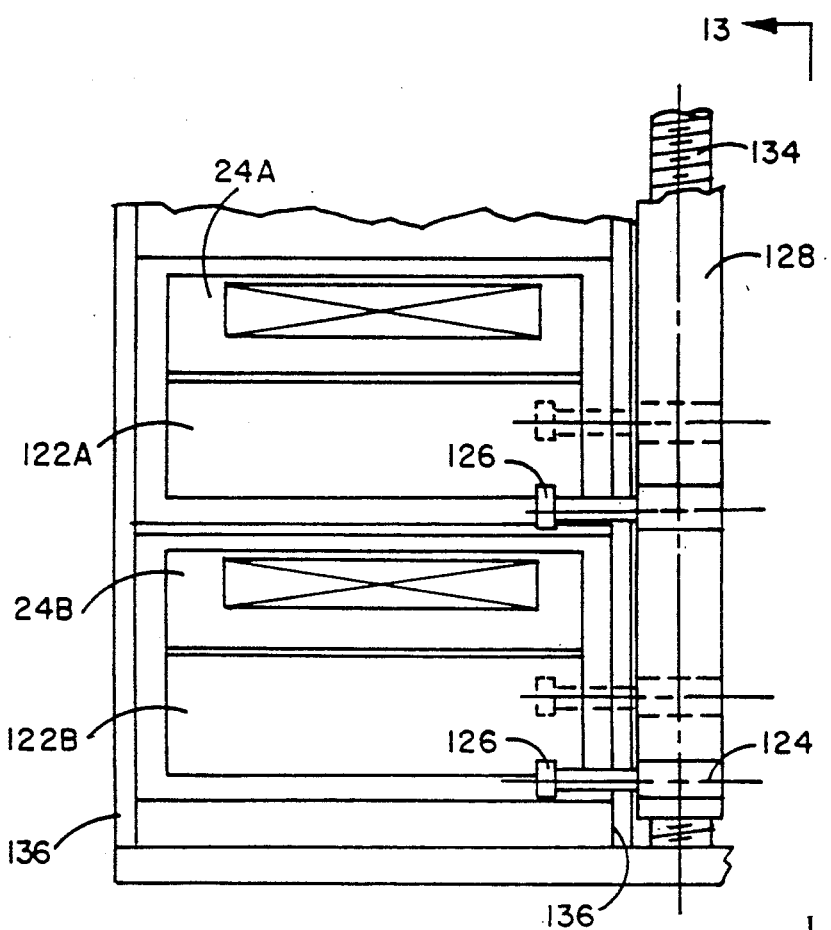
FIG. 12 is an enlarged partial view of FIG. 1 illustrating the modules and door closing mechanism.
Figure 13:
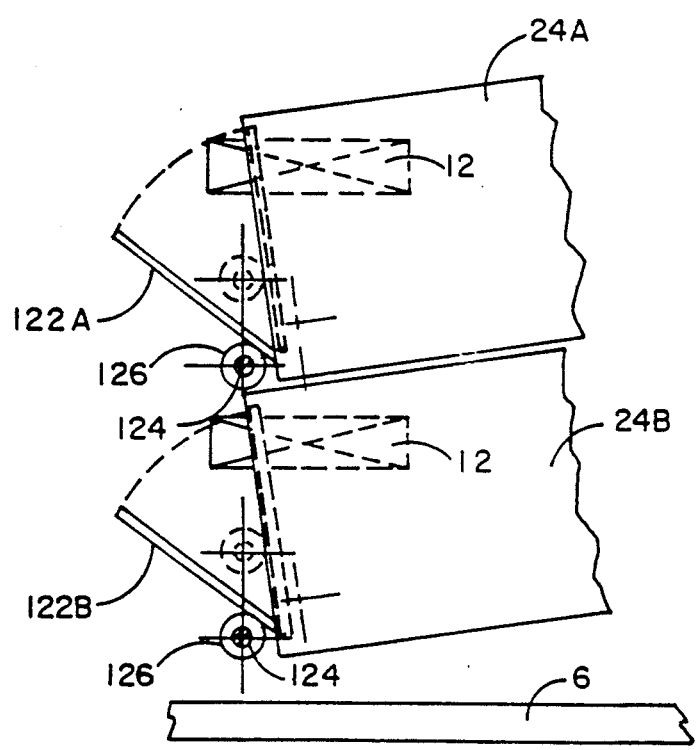
FIG. 13 is side view along line 13—13 of FIG. 12.

An external door-closing mechanism simultaneously closes the doors 122a and 122b (FIGS. 12 and 13) of the modules 24a and 24b. The modules are inclined from the horizontal so that vertical movement of door-actuating shafts 124 forces rollers 126 against the doors 122. The vertical distance traveled by the rollers 126 is adjusted to move the doors just enough that the internal door latches in the modules will lock and retain the doors in closed position. The rollers 126 are supported by the shafts 124 which are fastened to a tubular member 128 (FIG. 12). The member 128 is driven vertically by a lead screw 134 which is driven by a conventional servomotor (not shown) that is mounted on either the top plate 4 or the bottom plate 6. The shafts 124 are readily detachable from the tubular member 128 to permit easy removal of the modules 122 from the vertical mounting frames 136.

Figure 14:
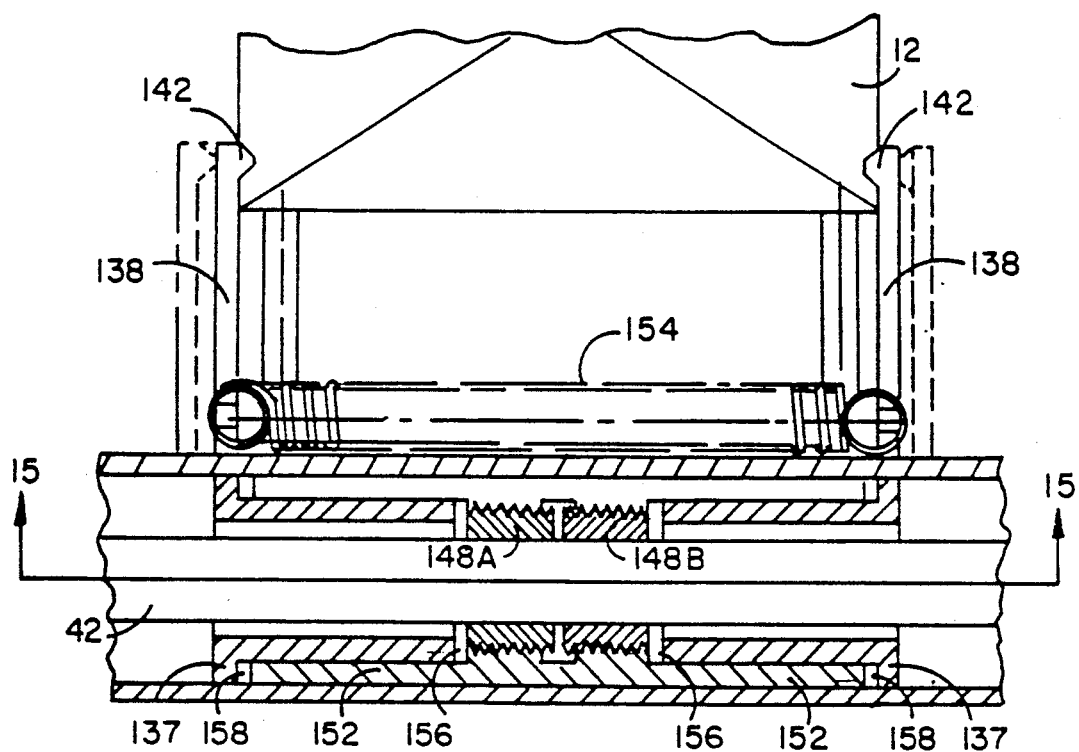
FIG. 14 is an enlarged partial cross section along line 14—14 of FIG. 1.
Figure 15:
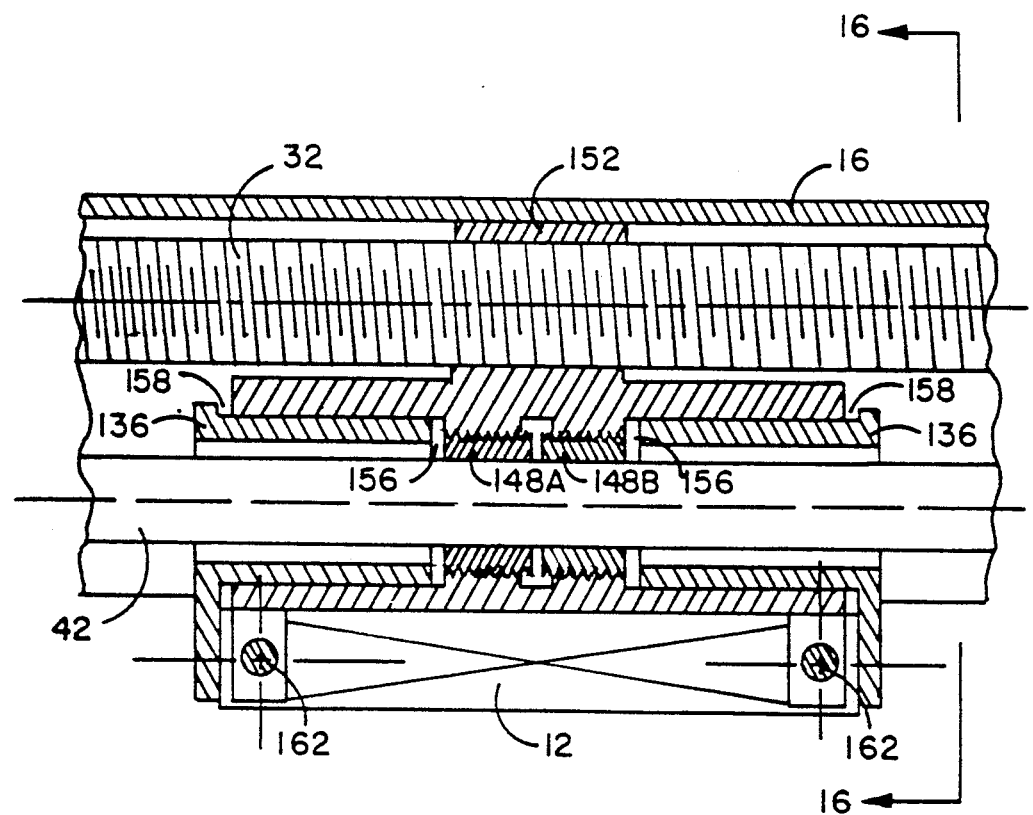
FIG. 15 is a cross section along line 15—15 of FIG. 14.
Figure 16:
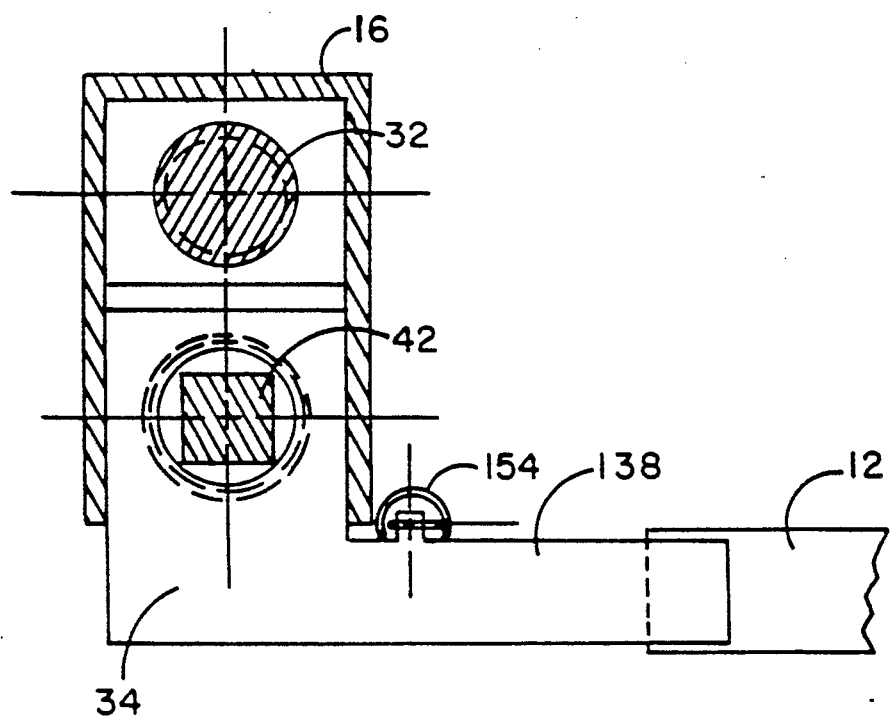
FIG. 16 is a cross section along line 16—16 of FIG. 15.

The carriage 34 (FIG. 3) that transports the cartridges 12 has two bushings 137 (FIGS. 14 and 15) that are each integral with a gripper finger 138. The end portion 142 of each gripper finger is shaped to fit into a recess in the cartridge. The gripper fingers are also shaped to leave the back 144 of the cartridge 12 (FIGS. 14 and 16) exposed so a label such as a bar code strip can be read at all times while the cartridge is held by the gripper fingers. The bushings 137 are restrained from rotation by a either locking pin (not shown) or arm 16. The axial motion of the bushing 137 is controlled by two actuating lead screws 148a and 148b (FIG. 14). One of the screws has a left-hand thread and the other a right-hand thread, and both are threaded inside a housing 152. The rotation of the lead screws is caused by the rotation of the drive shaft 42 which is driven by the servomotor 44 (FIG. 1). The rotation of the two lead screws 148 causes the two gripper fingers 138 to open away from the cartridge. When the direction of rotation of the lead screws 148 is reversed, the gripper fingers are closed onto the cartridge by a return spring 154. The travel of the two lead screws 148 is such that when the gripper fingers are clutching the cartridge 12, there is a gap 156 between the ends of the bushings 136 and the external ends of the lead screws 148. This gap allows for variations in the dimensions of the cartridges and allows the force of the spring 154 to maintain its holding force on the cartridge. There is another gap 158 between the ends of the bushings 136 and the end of the housing 152. This gap allows the two bushings 136 and the gripper fingers 138 to float axially inside the housing 152, while holding the cartridge secure. This floating action provides lateral compliance of the cartridge during insertion and removal to and from the either a carrousel or a module. Two spring-loaded pins 162 insure that the cartridge is pushed against its locating stop inside the modules or in the carrousel when the gripper fingers are open. This insures precise fore and aft positioning of the cartridge after insertion or before removal into or from a carrousel or module.

No detailed control system has been described here because the electronics and the software for such systems are well known. It is understood, however, that a control system is necessary to direct the functions of the cartridge-handling elements. The control system includes software for recording the storage location of each cartridge, identified by a bar code on the cartridge or other source; moving the robotic arm 16 vertically to position it at a particular tier of the carrousel where the cartridge is stored or to be stored, or at the level of the input-output tray 22 or a module 24; actuating the grippers 138 to hold and release the cartridges; moving carriage 34 horizontally between a first position in vertical alignment with the storage-retrieval stations and a second position in vertical alignment with the tray 22 at the delivery window and with the doors of the modules 24; and swinging the arm 16 from a first position in which a cartridge is either loaded or released, and a second position permitting the carriage to move longitudinally along the arm. The control system also includes software to operate the modules to read the cartridge tapes, as when searching a tape for the location of specific data and writing an identification on the tapes or data contained in the cartridge.

I claim:
1. The combination comprising
   a module for utilizing data storage cartridges,
   a carrousel having storage spaces for a plurality of data storage cartridges and having a predefined storage-retrieval station,
   first drive means for rotating said carrousel and stopping at any of a plurality of predetermined positions,
   a robotic arm,
   means supporting said arm for rotational movement about an axis parallel with and offset from the rotational axis of said carrousel,
   second drive means for rotating said arm in a plane perpendicular to the plane of the rotational axis of said arm,
   a carriage mounted for longitudinal movement along said arm and having gripper means for holding one of said cartridges,
   third drive means for transporting said gripper means along the longitudinal axis of said arm between said storage-retrieval station and said module, and
   means for opening and closing said gripper means.
2. The combination as claimed in claim 1 including
   a housing enclosing said library and having a cartridge reception and delivery door,
   a module for reading information contained in said cartridges, and
   a module door for placing cartridges in said module, wherein
   said module door, said storage-retrieval station, and the rotational axis of said arm are positioned approximately on a straight line.
3. The combination as claimed in claim 2 including
   means for stopping said carrousel with a predetermined cartridge at said storage-retrieval station,
   control means for actuating said gripper means to grasp said cartridge, and optionally move said carriage to said module door or to said cartridge reception and delivery door.
4. In an automatic data-storage library, the combination comprising
   a housing having a window and a receiving tray for receiving and delivering data storage cartridges,
   a carrousel having multiple vertically displaced storage tiers, each having storage spaces for a plurality of said cartridges and having a predefined storage-retrieval station,
   a module for reading information contained in said cartridges,
   a rotatable vertical column,
   a robotic arm secured to said column, carriage means on said arm for releasably holding a cartridge, first drive means for rotating said column thereby to move said arm between a first position in which said carriage is adjacent said storage-retrieval station, said module, or said receiving tray, and a second position in which said carriage is removed from said storage-retrieval station, said module and said tray, second drive means for moving said arm vertically on said column thereby to position said arm adjacent different tiers of said carrousel, said second drive means including first and second drive plates secured at spaced points to said first column, a lead screw extending between said drive plates and in threaded engagement with said arm, and motor means for rotating said lead screw, second drive means for moving said carriage means horizontally between first and second positions on said arm, said first position being at said storage retrieval station, and said second station being in vertical alignment with said module and said receiving tray.

5. The combination claimed in claim 4 wherein
a straight line through a cartridge in reading position in said module and another cartridge at said storage-retrieval station passes through the center of rotation of said column.

6. In an automatic data storage library for storing and retrieving a plurality of data cartridges, the combination comprising a carrousel rotatably mounted for rotation about a first axis and having a plurality of separate sub-carrousels, each rotatably mounted on an auxiliary axis parallel with and displaced from said first axis, each sub-carrousel including means for storing a plurality of data cartridges, a primary drive shaft for rotating said carrousel, a plurality of sub-carrousel drive shafts each secured to one of said carrousels whereby each sub-carrousel can rotate about its own auxiliary axis, means for rotating said primary drive shaft to rotate said carrousel, a sub-carrousel drive system comprising a first synchronizing member supported by and rotatable on said primary drive shaft and coupled with a predetermined speed ratio to one of said sub-carrousel driver shafts, and means coupling all of said sub-carrousel drive shafts together for synchronized rotation.

7. The combination claimed in claim 6 wherein
said carrousel has a plurality of vertically spaced tiers each including a plurality of sub-carrousels.

8. The combination claimed in claim 6 wherein
said carrousel includes four sub-carrousels and each sub-carrousel has storage space for four cartridges.

9. The method of storing back-up data for a computer system comprising the steps of providing a carrousel rotatable about a first vertical axis and having spaces for storing a plurality of data storage cartridges, coding the storage space of each cartridge, rotating said carrousel to a predetermined position in accordance with said coding to place a selected one of said cartridges at a storage-retrieval station, providing a robotic arm rotatable about a second vertical axis offset from said first vertical axis of said carrousel, providing a tape-reading module, moving said cartridge longitudinally along said arm from said storage-retrieval station to said module, the position of said cartridge when in said module and when at said storage-retrieval station being in a plane passing through the rotational axis of said arm.

10. In an automatic storage library for data cartridges, the combination comprising a housing, a cartridge receiving window in said housing, a cartridge-reading module for reading data from said cartridges, a primary carrousel rotatably mounted on a first axis and having a plurality of sub-carrousels each rotatably mounted for rotation about an auxiliary axis parallel with and offset from said first axis and having storage space for a plurality of cartridges, means for rotating said primary carrousel and said sub-carrousels as a unit about said first axis, means for rotating each of said carrousels about its auxiliary axis in synchronized relationship to the rotation of said primary carrousel.

means for positioning said carrousel too place a predetermined cartridge stored on said carrousel at a storage retrieval station, and means for transferring cartridges between said window, said module and said storage-retrieval station.

11. The combination claimed in claim 10 wherein
said module and said window are on common vertical line.

12. The combination claimed in claim 11 wherein
said means for transfering said cartridges includes an arm supported for arcuate movement about a predetermined vertical axis.

13. The combination claimed in claim 12 wherein
a cartridge at said storage-retrieval station, and a cartridge in said module, and a cartridge in said window are in a common plane with the rotational axis of said arm.

* * * * *